(12) United States Patent
Yang et al.

(10) Patent No.: US 11,860,409 B2
(45) Date of Patent: Jan. 2, 2024

(54) DISPLAYS WITH COHERENT FIBER BUNDLES

(71) Applicant: Apple Inc., Cupertino, CA (US)

(72) Inventors: Tseng-Mau Yang, Mississauga (CA); Christopher D. Prest, San Francisco, CA (US); Dale N. Memering, New York, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/398,291

(22) Filed: Aug. 10, 2021

(65) Prior Publication Data

US 2021/0364693 A1 Nov. 25, 2021

Related U.S. Application Data

(63) Continuation of application No. 16/561,250, filed on Sep. 5, 2019, now Pat. No. 11,131,803, which is a
(Continued)

(51) Int. Cl.
*G02B 6/08* (2006.01)
*G02B 6/12* (2006.01)
(Continued)

(52) U.S. Cl.
CPC ............. *G02B 6/08* (2013.01); *G02B 6/0078* (2013.01); *G02F 1/3137* (2013.01); *G02B 2006/12145* (2013.01); *G02F 1/0142* (2021.01)

(58) Field of Classification Search
CPC ...... G02B 6/08; G02B 6/0078; G02B 6/3137; G02B 2006/12145; G02F 1/0142
See application file for complete search history.

(56) References Cited

U.S. PATENT DOCUMENTS 4,099,833 A 7/1978 Tosswill
4,139,261 A 2/1979 Hillsum
(Continued)

FOREIGN PATENT DOCUMENTS

EP 2306437 A1 6/2011
EP 2423906 B1 2/2012
(Continued)

OTHER PUBLICATIONS

Schott North America, Introduction to Fiber Optic Imaging, Feb. 2007, Schott North America Inc., Second Edition.

*Primary Examiner* — Ryan A Lepisto
*Assistant Examiner* — Erin D Chiem
(74) *Attorney, Agent, or Firm* — Treyz Law Group, P.C.; G. Victor Treyz; David K. Cole

(57) ABSTRACT

A display may have an array of display pixels that generate an image. A coherent fiber bundle may be mounted on the display pixels. The coherent fiber bundle may have a first surface that is adjacent to the display pixels and a second surface that is visible to a viewer. The coherent fiber bundle may contain fibers that carry light from the first surface to the second surface. The second surface may be planar or may have a central planar region and curved edge regions that run along opposing sides of the central planar region. The fibers may have cross-sectional surface areas with a first aspect ratio on the first surface and a second aspect ratio that is greater than the first aspect ratio on the second surface.

19 Claims, 10 Drawing Sheets

Related U.S. Application Data continuation of application No. 15/227,873, filed on Aug. 3, 2016, now Pat. No. 10,436,979, which is a continuation of application No. 13/564,995, filed on Aug. 2, 2012, now Pat. No. 9,435,939.

(51) Int. Cl.
*G02F 1/313* (2006.01)
*F21V 8/00* (2006.01)
*G02F 1/01* (2006.01)

(56) References Cited

U.S. PATENT DOCUMENTS

| | | | |
|---|---|---|---|
| 4,613,210 | A | 9/1986 | Pollard |
| 4,904,019 | A | 2/1990 | May |
| 5,465,315 | A | 11/1995 | Sakai et al. |
| 6,892,011 | B2 | 5/2005 | Walker et al. |
| 6,892,014 | B2 | 5/2005 | Cok et al. |
| 6,927,908 | B2 | 8/2005 | Stark |
| 7,228,051 | B2 * | 6/2007 | Cok .................. G02B 6/3676 385/146 |
| 7,551,372 | B2 | 6/2009 | Xun et al. |
| 7,592,971 | B2 * | 9/2009 | Chang ............... G02F 1/13336 345/1.3 |
| 7,663,715 | B2 | 2/2010 | Jin et al. |
| 7,742,120 | B2 | 6/2010 | Bayley et al. |
| 7,773,849 | B2 | 8/2010 | Shani |
| 7,856,161 | B2 | 12/2010 | Tabor |
| 8,085,216 | B2 | 12/2011 | Miller |
| 8,368,729 | B2 | 2/2013 | Watanabe |
| 8,472,114 | B2 | 6/2013 | Watanabe |
| 8,541,934 | B2 | 9/2013 | Watanabe et al. |
| 8,666,212 | B1 | 3/2014 | Amirparviz |
| 8,690,414 | B2 | 4/2014 | Tomotoshi et al. |
| 8,692,737 | B2 | 4/2014 | Watanabe et al. |
| 8,907,863 | B2 | 12/2014 | Li |
| 2001/0046365 | A1 | 11/2001 | Bohle et al. |
| 2002/0000967 | A1 | 1/2002 | Huston et al. |
| 2003/0012532 | A1 | 1/2003 | Prigent |
| 2004/0017985 | A1 | 1/2004 | Cok et al. |
| 2004/0051944 | A1 | 3/2004 | Stark |
| 2004/0100796 | A1 | 5/2004 | Ward |
| 2005/0185114 | A1 | 8/2005 | Cok |
| 2005/0226574 | A1 | 10/2005 | Walker et al. |
| 2006/0007054 | A1 | 1/2006 | Chang et al. |
| 2006/0007369 | A1 | 1/2006 | Jin et al. |
| 2006/0077544 | A1 | 4/2006 | Stark |
| 2006/0146013 | A1 | 7/2006 | Arneson et al. |
| 2007/0052614 | A1 | 3/2007 | Zimmerman |
| 2007/0097108 | A1 | 5/2007 | Brewer |
| 2008/0309633 | A1 | 12/2008 | Hotelling et al. |
| 2009/0059366 | A1 | 3/2009 | Imai |
| 2009/0103191 | A1 | 4/2009 | Xun et al. |
| 2010/0061040 | A1 | 3/2010 | Dabov et al. |
| 2011/0025594 | A1 | 2/2011 | Watanabe |
| 2011/0026090 | A1 | 2/2011 | Minor et al. |
| 2011/0102302 | A1 | 5/2011 | Watanabe |
| 2011/0109535 | A1 | 5/2011 | Watanabe et al. |
| 2011/0109622 | A1 | 5/2011 | Son et al. |
| 2011/0242686 | A1 | 10/2011 | Watanabe |
| 2011/0254790 | A1 | 10/2011 | Suzuki et al. |
| 2011/0255301 | A1 | 10/2011 | Watanabe |
| 2011/0285934 | A1 | 11/2011 | Watanabe |
| 2012/0008340 | A1 | 1/2012 | Tomotoshi et al. |
| 2012/0049718 | A1 | 3/2012 | Watanabe et al. |
| 2012/0300304 | A1 | 11/2012 | Gollier et al. |
| 2013/0083080 | A1 | 4/2013 | Rappoport et al. |
| 2013/0235561 | A1 | 9/2013 | Etienne et al. |
| 2013/0258213 | A1 | 10/2013 | Ek |
| 2013/0278872 | A1 | 10/2013 | Teller et al. |
| 2013/0279177 | A1 | 10/2013 | Moriwaki et al. |
| 2013/0307826 | A1 | 11/2013 | Ma et al. |
| 2014/0009838 | A1 | 1/2014 | Weber et al. |
| 2014/0092346 | A1 | 4/2014 | Yang et al. |
| 2014/0176827 | A1 | 6/2014 | Gollier et al. |

FOREIGN PATENT DOCUMENTS

| | | |
|---|---|---|
| EP | 2439582 A1 | 11/2012 |
| JP | 60227232 A | 11/1985 |
| JP | 2006139058 A | 6/2006 |
| KR | 10-2000-020849 U | 4/2000 |
| WO | 200242838 A1 | 5/2002 |
| WO | 2009122691 A1 | 10/2009 |
| WO | 2010055671 A1 | 5/2010 |
| WO | 2010070871 A1 | 6/2010 |
| WO | 2010122781 A1 | 10/2010 |
| WO | 2011093243 A1 | 8/2011 |

* cited by examiner

DISPLAYS WITH COHERENT FIBER BUNDLES

This application is a continuation of patent application Ser. No. 16/561,250, filed Sep. 5, 2019, which is a continuation of patent application Ser. No. 15/227,873, filed Aug. 3, 2016, now U.S. Pat. No. 10,436,979, which is a continuation of patent application Ser. No. 13/564,995, filed Aug. 2, 2012, now U.S. Pat. No. 9,435,939, which are hereby incorporated by reference herein in their entireties.

BACKGROUND

This relates to electronic devices and, more particularly, to displays for electronic devices.

Electronic devices such as cellular telephones and other portable devices are often provided with displays. In a typical configuration, a rectangular array of display pixels is located in a central active region in the display. An inactive border region surrounds the central active region. Components such as driver circuits can be formed in the inactive border region. The inactive border must generally contain sufficient space for these components, because these components are used in controlling the operation of the display. Nevertheless, excessively large inactive border regions may make a device overly large and may detract from device aesthetics.

It would therefore be desirable to be able to provide improved displays for an electronic device.

SUMMARY

A display may have an array of display pixels that generate an image. The display may be mounted in an electronic device housing in a configuration that minimizes or eliminates the inactive border area surrounding the display.

The display may have a coherent fiber bundle that is mounted on the display pixels. The coherent fiber bundle may have a first surface that is adjacent to the display pixels and a second surface that is visible to a viewer. The coherent fiber bundle may contain fibers that carry light from the first surface to the second surface.

The second surface may be planar or may have a central planar region and curved edge regions that run along opposing sides of the central planar region. The fibers may have cross-sectional surface areas with a first aspect ratio on the first surface and a second aspect ratio that is greater than the first aspect ratio on the second surface.

The display and coherent fiber bundle may have first and second lateral dimensions. The fibers in the coherent fiber bundle may be curved along one of the lateral dimensions and not the other, so as to create an overhang that covers inactive components.

Further features of the invention, its nature and various advantages will be more apparent from the accompanying drawings and the following detailed description of the preferred embodiments.

DETAILED DESCRIPTION

Figure 1:
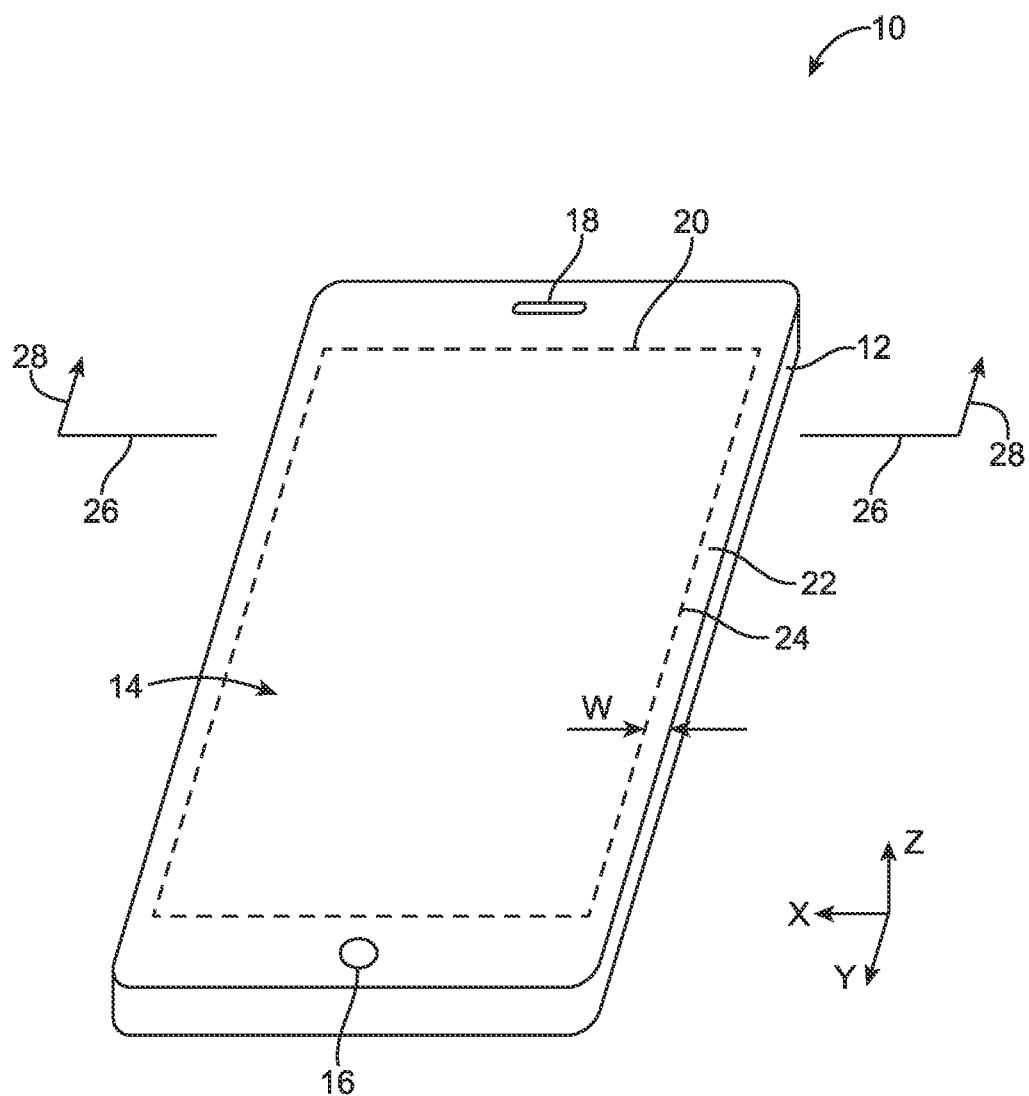
FIG. 1 is a front perspective view of an illustrative electronic device of the type that may be provided with a display in accordance with an embodiment of the present invention.

An illustrative electronic device of the type that may be provided with a display is shown in FIG. 1. Device 10 of FIG. 1 may be a handheld device such as a cellular telephone or media player, a tablet computer, a notebook computer, other portable computing equipment, a wearable or miniature device such as a wristwatch or pendant device, a television, a computer monitor, or other electronic equipment.

As shown in FIG. 1, electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, or display pixels based on other display technologies.

Display 14 may be protected using an optional display cover layer such as a layer of transparent glass or clear plastic. Openings may be formed in the display cover layer. For example, an opening may be formed in the display cover layer to accommodate a button such as button 16 and an opening such as opening 18 may be used to form a speaker port. Device configurations without openings in display 14 may also be used for device 10.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be characterized by an active region such as rectangular active region 20 (the area inside rectangular dotted line 20). Images may be displayed in the active region using an associated array of display pixels (e.g., backlight LCD cells, organic light-emitting diode cells, or other image-producing display elements). The rectangular active region 20 may be surrounded by an inactive region such as inactive border region 22.

Inactive border region 22 may be characterized by a minimum width W (e.g., along the left and right edges of display 14 of FIG. 1). To minimize the size of width W, display 14 may be provided with a coherent fiber bundle that expands the size of the display along the edges of device 10 (e.g., in lateral dimension X). The size of width W may be reduced to less than 2 mm, less than 1 mm, less than 0.5 mm, less than 0.2 mm, or may be reduced to zero or a negligible amount.

Figure 2:
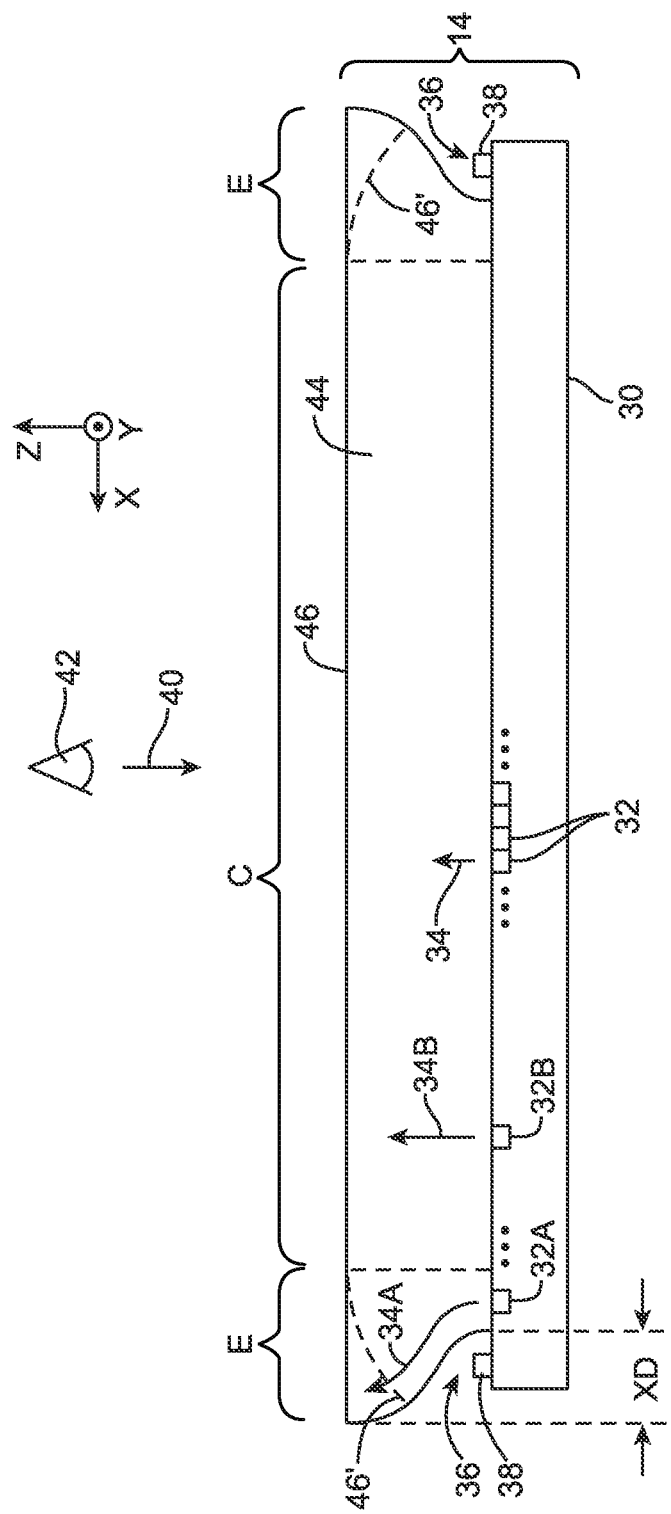
FIG. 2 is a cross-sectional side view of a display with a coherent fiber bundle in accordance with an embodiment of the present invention.

FIG. 2 is a cross-sectional side view of display 14 taken along line 26 and viewed in direction 28. As shown in FIG. 2, display 14 may include display structures 30. Display structures 30 may be formed from organic light-emitting diode structures, backlit electrophoretic display structures, backlight electrowetting display structures, or backlight liquid crystal display (LCD) display layers (as examples). For example, display structures 30 may include liquid crystal display structures such as a color filter layer, a thin-film transistor layer, and a layer of liquid crystal material that is formed between the color filter layer and the thin-film transistor layer.

Display structures 30 may include an array of display pixels 32. When controlled using display driver circuitry, the array of display pixels 32 may be used in presenting images to a viewer such as viewer 42, who is viewing display 14 in direction 40. Circuitry such as display driver circuitry and other display components that do not display images may be located in inactive edge region 36 of display 14. Region 36 may include, for example, a bead of sealant interposed between a color filter layer and a thin-film transistor layer, thin-film transistors (e.g., gate driver circuitry), and traces for providing display control signals to display pixels 32 (shown illustratively as structures 38).

Coherent fiber bundle 44 may have multiple fibers that convey light 34 from pixels 32 vertically upwards to display surface 46. Fiber bundle 44 is coherent in that images that are created by display pixels 32 are not scrambled or otherwise disturbed when passing through fiber bundle 44. Viewer 42 may therefore view satisfactory images on surface 46, including central portion C and edge portions E.

In central portion C of coherent fiber bundle 44, light 34B from display pixels 32B may be conveyed to surface 46 through fibers that extend parallel to one another along dimension Z. In edge regions E, coherent fiber bundle 44 may include fibers that guide light 34A from display pixels 32A to surface 46 along curved paths. The use of curved paths for the fibers in bundle 44 in edge regions E allows edge regions E to overlap inactive display regions 36 when display 14 is viewed in direction 40 by viewer 42, thereby presenting viewer 42 with a borderless display (i.e., a display in which inactive region width W of FIG. 1 is zero with respect to dimension Y and, if desired, with respect to dimension X).

As shown in FIG. 2, for example, the curved nature of the fibers in portion E of coherent fiber bundle 44 may create an overhang that extends by an amount XD over inactive region 36. The amount XD may be sufficient to narrow the size of the inactive display region (region 22 of FIG. 1) in display 14 or may, as shown in FIG. 2, may be sufficient to completely cover inactive regions 36 so that display 14 is effectively borderless in dimension Y and, if desired, in dimension X.

Coherent fiber bundle 44 may be formed from a set of parallel fibers. The fibers may be formed from a clear material such as glass. Each fiber may have a core and a cladding. The index of refraction of the core may be greater than the index of refraction of the cladding to promote total internal reflection. Fibers may be heated and manipulated using stretching equipment and/or rollers or other pressing equipment. Glass particles or other binders may be used in binding individual fibers together to form fiber bundle 44. Using fabrication techniques such as these, the fibers in fiber bundle 44 may be positioned so as to follow straight paths (i.e., straight paths such as paths 34B of FIG. 2) or curved paths such as curved path 34A of FIG. 2.

The shape of surface 46 may be planar or may have a curved shape (e.g., along the opposing left and right edges of the display), as illustrated by dotted line 46' of FIG. 2.

Figure 3:
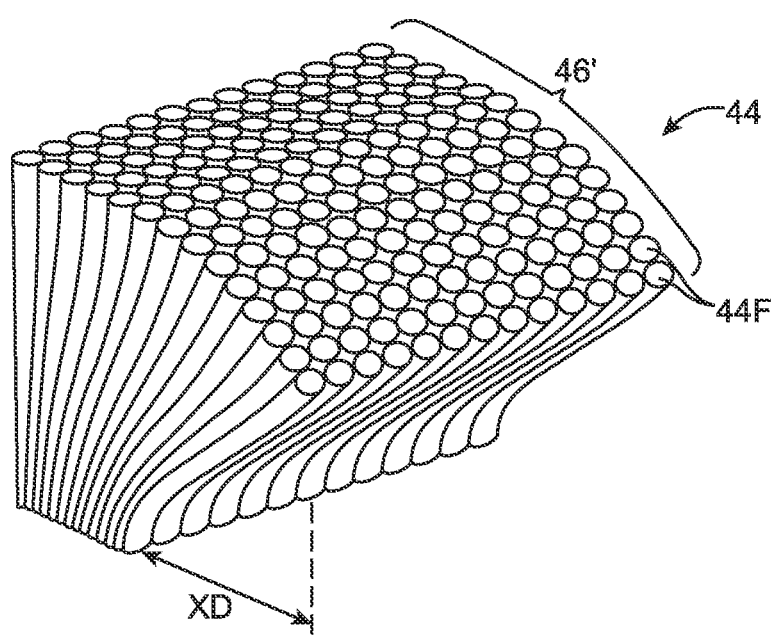
FIG. 3 is a perspective view of a curved edge portion of an illustrative coherent fiber bundle for a display in accordance with an embodiment of the present invention.

FIG. 3 is a perspective view of a portion of coherent fiber bundle 44 in a configuration in which fibers 44F have been shaped to form a curved surface such as surface 46'. Fibers 44F may have a circular cross-sectional shape on surface 46' (as an example). In shapes such as circular or square shapes, a shape may be said to have a 1:1 aspect ratio (width versus length). In elongated shapes such as rectangles or ovals, the aspect ratio of the shape may be different (e.g., 1:3, etc.). In fiber bundle 44, the aspect ratio of the area of the fibers may be constant or may change between the upper and lower surfaces of the bundle.

Figure 4:
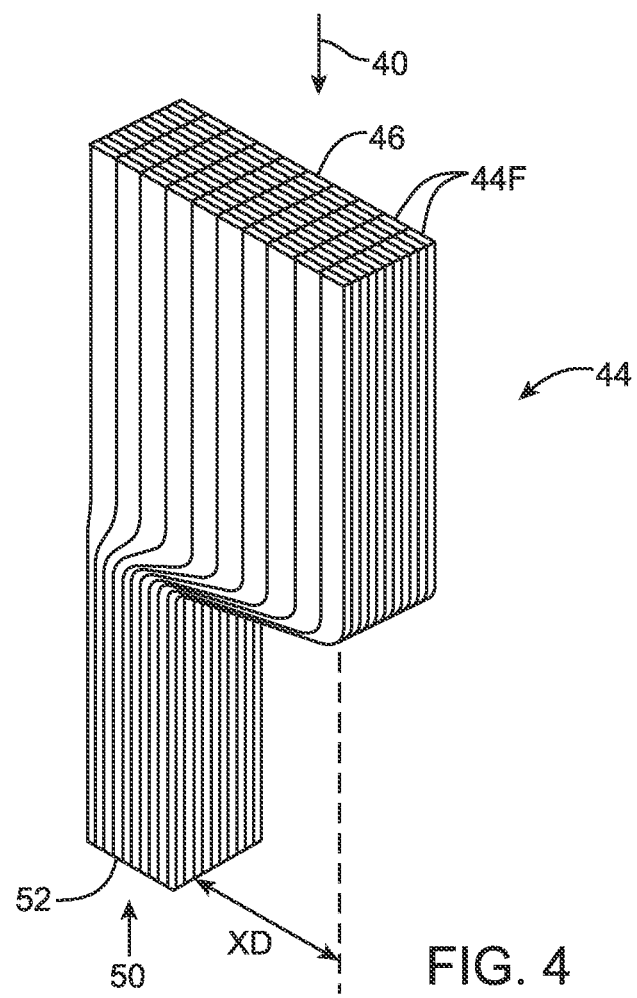
FIG. 4 is a perspective view of an illustrative coherent fiber bundle in accordance with an embodiment of the present invention.

FIG. 4 is a perspective view of portion of coherent fiber bundle 44 in a configuration in which fibers 44F have been shaped to form a flat surface such as surface 46'.

Figure 5:
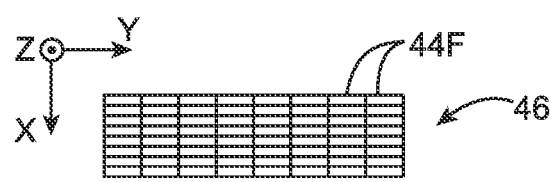
FIG. 5 is a top view of the fiber bundle of FIG. 4 showing how the fiber surfaces at the top of the fiber bundle may have elongated cross-sectional areas in accordance with an embodiment of the present invention.
Figure 6:
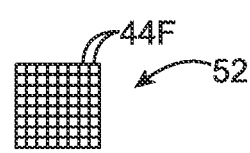
FIG. 6 is a bottom view of the fiber bundle of FIG. 4 showing how the fiber surfaces at the bottom of the fiber bundle may have square cross-sectional shapes in accordance with an embodiment of the present invention.

FIG. 5 is a top view of fiber bundle 44 showing fibers 44F on top surface 46 when viewed in direction 40 of FIG. 4. As shown in FIG. 5, coherent fiber bundle upper surface 46 may have fibers 44F having rectangular areas with an aspect ratio of about 4:1 (e.g., an aspect ratio greater than 1.5:1, greater than 2:1, greater than 3:1, or greater than 5:1). As shown in FIG. 6, coherent fiber bundle lower surface 52 may have fibers 44F that have square areas or areas of other shapes with a 1:1 aspect ratio (e.g., an aspect ratio less than 1.5:1, less than 2:1, less than 3:1, or less than 5:1). By using fiber bundles with changing aspect ratios, it is possible to transition between a relatively smaller area such as lower surface area 52 of coherent bundle 44 of FIG. 4 to a relatively larger area such as upper surface area 46 of coherent bundle 44 of FIG. 4 within edge region E, while retaining a planar shape to upper surface 46. This allows display 14 to have a planar surface that extends from edge to edge.

Figure 7:
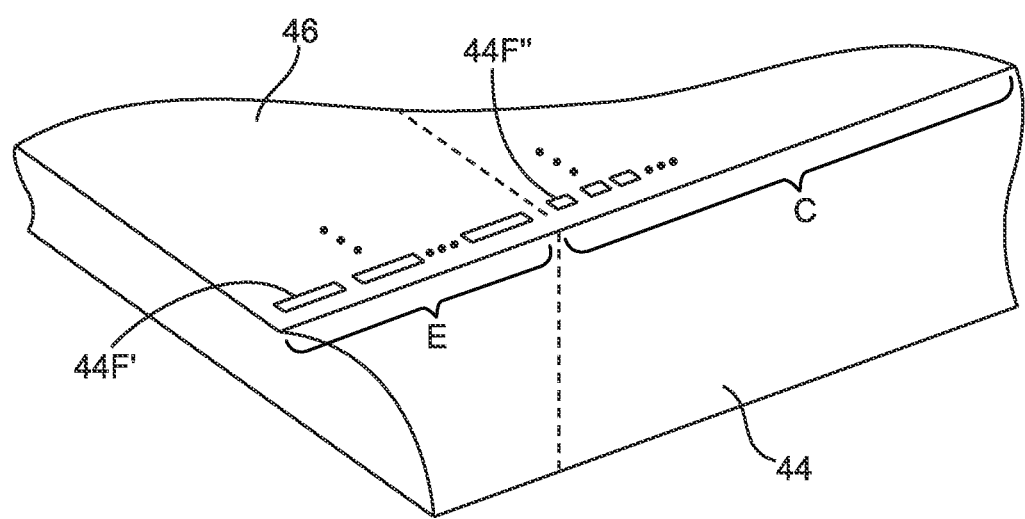
FIG. 7 is a perspective view of an edge portion of a coherent fiber bundle in a display in accordance with an embodiment of the present invention.

As shown in the perspective view of FIG. 7, in portions E, fibers 44F' may have a rectangular cross-sectional area (i.e., elongated aspect ratios), whereas in central region C, the surfaces of fibers 44F" may have 1:1 aspect ratios (e.g., aspect ratios that are less than the aspect ratios of fibers 44F').

Figure 8:
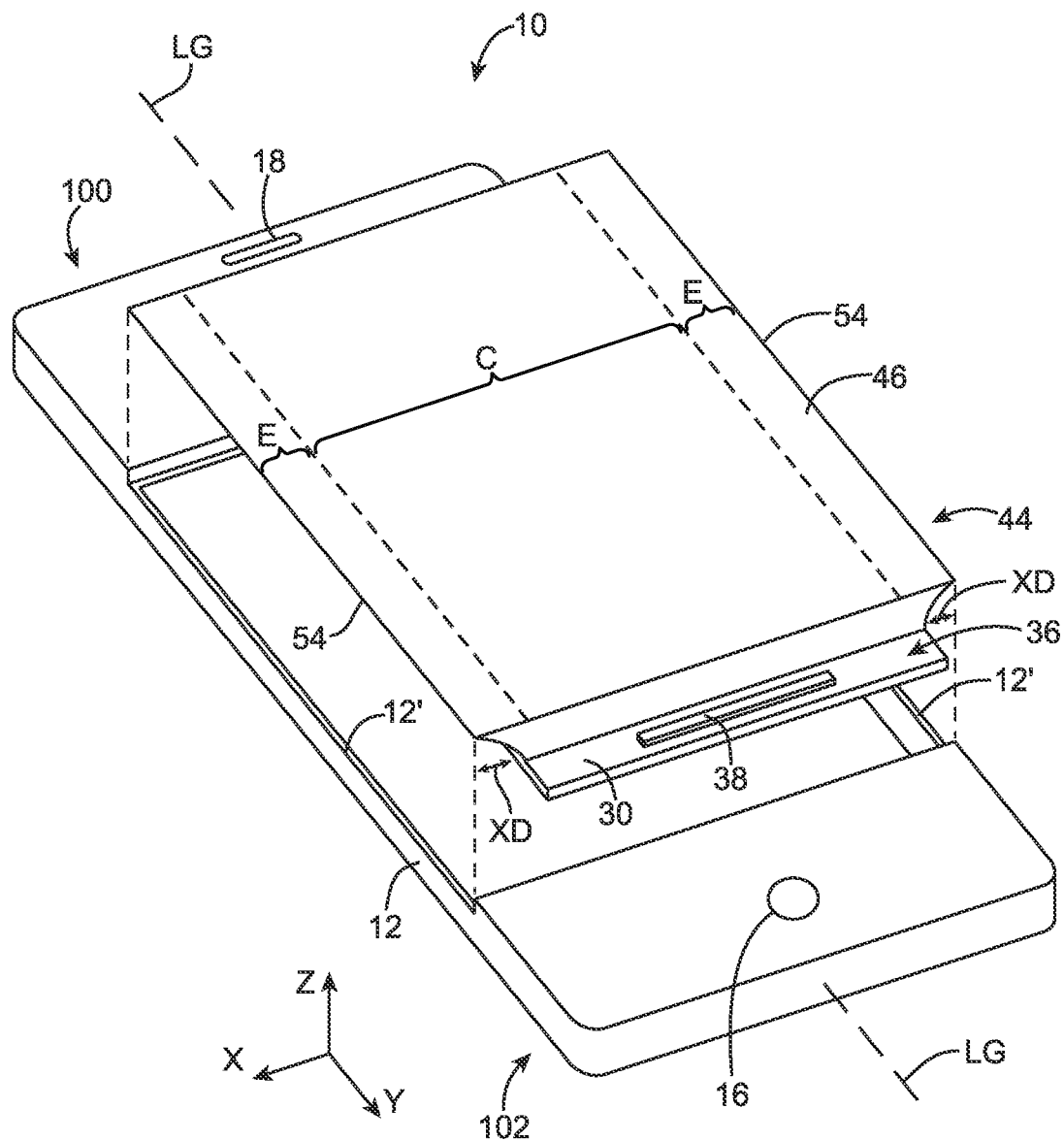
FIG. 8 is an exploded perspective view of an electronic device having a display with a coherent fiber bundle in accordance with an embodiment of the present invention.

FIG. 8 is a perspective view of device 10 showing how display 14 may have edges E that extend laterally in dimension Y so as to create overhang XD in dimension Y. This allows display 14 to be borderless or nearly borderless in dimension Y. Device housing 12 may have sidewall edges 12' that run parallel to each along longitudinal axis LG of device 10 between lower end 102 and upper end 100 of device 10. If desired, left and right edges 54 may overlap edges 12' of housing 12 in device 10, so that display 14 appears borderless in dimension Y.

In dimension X, inactive portions 36 of display structures 30 (e.g., a thin-film transistor layer and/or other layers in display 14) may be used to accommodate components 38 such as driver integrated circuits, flexible printed circuit cable attachment patterns, or traces for distributing display control signals to transistors in the active portion of the display. Inactive portions 36 may also extend under edges E of fiber bundle 44. In this portion of inactive portions 36, thin-film transistor circuitry (e.g., for gate driver circuits), liquid crystal display sealant beads, and other inactive structures may be formed on display layers 30.

Figure 9:
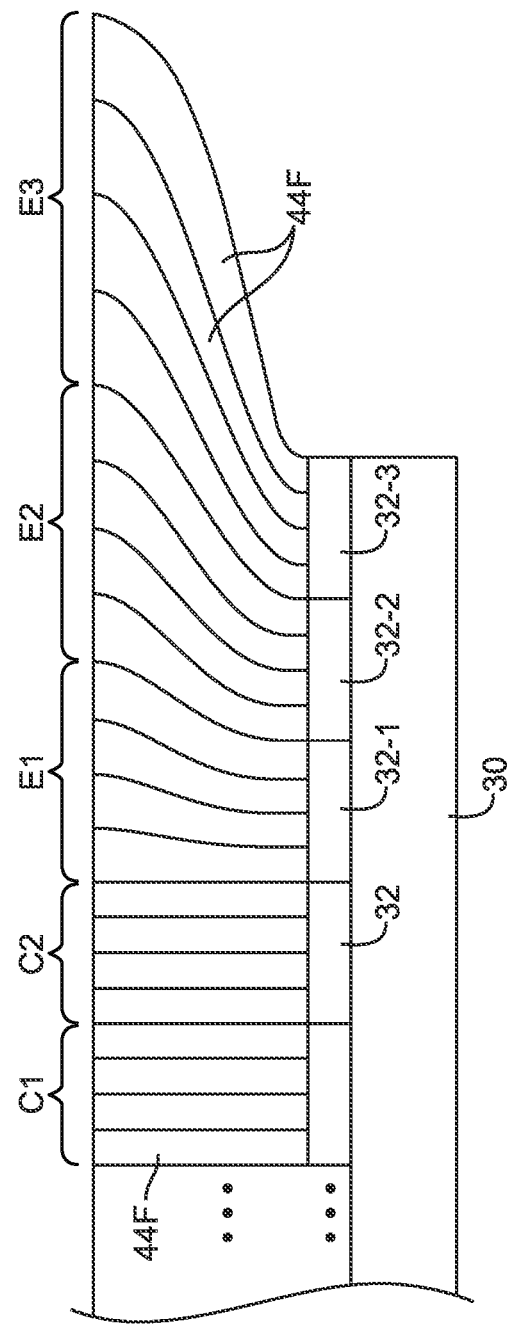
FIG. 9 is a cross-sectional side view of a coherent fiber bundle in which fibers have cross-sectional areas with varying aspect ratios in accordance with an embodiment of the present invention.

FIG. 9 is a cross-sectional side view of coherent fiber bundle 44 showing how multiple fibers 44F may be associated with each display pixel 32. In regions such as edge regions E1, E2, and E3, the shape of the surface area of each fiber 44F may be elongated (with an aspect ratio of 2:1 or more, as an example), as shown in FIG. 5. Regions E1, E2, and E3 are associated respectively with display pixels 32-1, 32-2, and 32-3. For example, the light produced by pixel 32-3 may be displayed in region E3 after being conveyed through the fibers 44F that overlap pixel 32-3. The use of larger aspect ratios for the surfaces of fibers 44F in regions E1, E2, and E3 allows upper surface 46 of display 14 to be planar (if desired). In central regions such as C1 and C2, fibers 44F may extend vertically upwards. There is some loss of display resolution in regions E1, E2, and E3 relative to in regions C1 and C2, but the information displayed in edge regions E1, E2, and E3 of display 14 may often contain solid colors or other low-information-content material, where the loss of resolution is immaterial to the performance of display 14.

Figure 10:
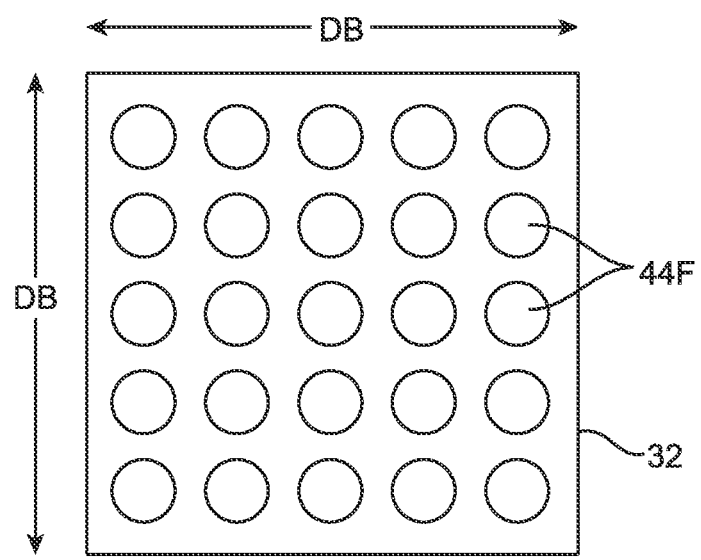
FIG. 10 is a top view of an illustrative display pixel showing how multiple fibers may overlap each pixel in a display in accordance with an embodiment of the present invention.

FIG. 10 is a top view of an illustrative display pixel showing how multiple fibers 44F may be associated with a single pixel. Each display pixel such as display pixel 32 of FIG. 10 may be associated with about N×N fibers 44F. As an example, a set of about 10-50 fibers 44F may be used to route light from each display pixel to the surface of coherent fiber bundle 44. Configurations in which a single fiber is associated with each display pixel or in which other numbers of fibers are associated with each display pixel may also be used, if desired.

Figure 11:
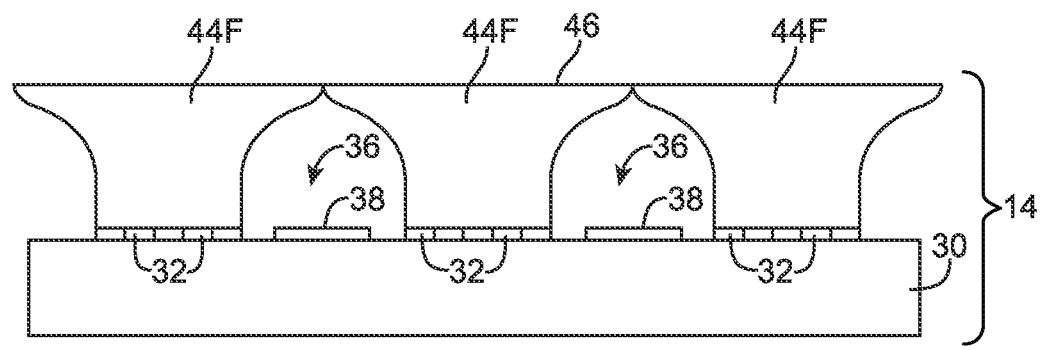
FIG. 11 is a cross-sectional side view of a display having multiple adjacent coherent fiber bundles in accordance with an embodiment of the present invention.

As shown in FIG. 11, multiple coherent fiber bundles such as bundles 44A, 44B, and 44C may be mounted adjacent to each other so that their peripheral edges (e.g., their left and right edges) may mate with each other, forming surface 46 of display 14 from multiple bundle surfaces. Inactive regions 36 on display layer 30 may be used for mounting components 38.

Figure 12:
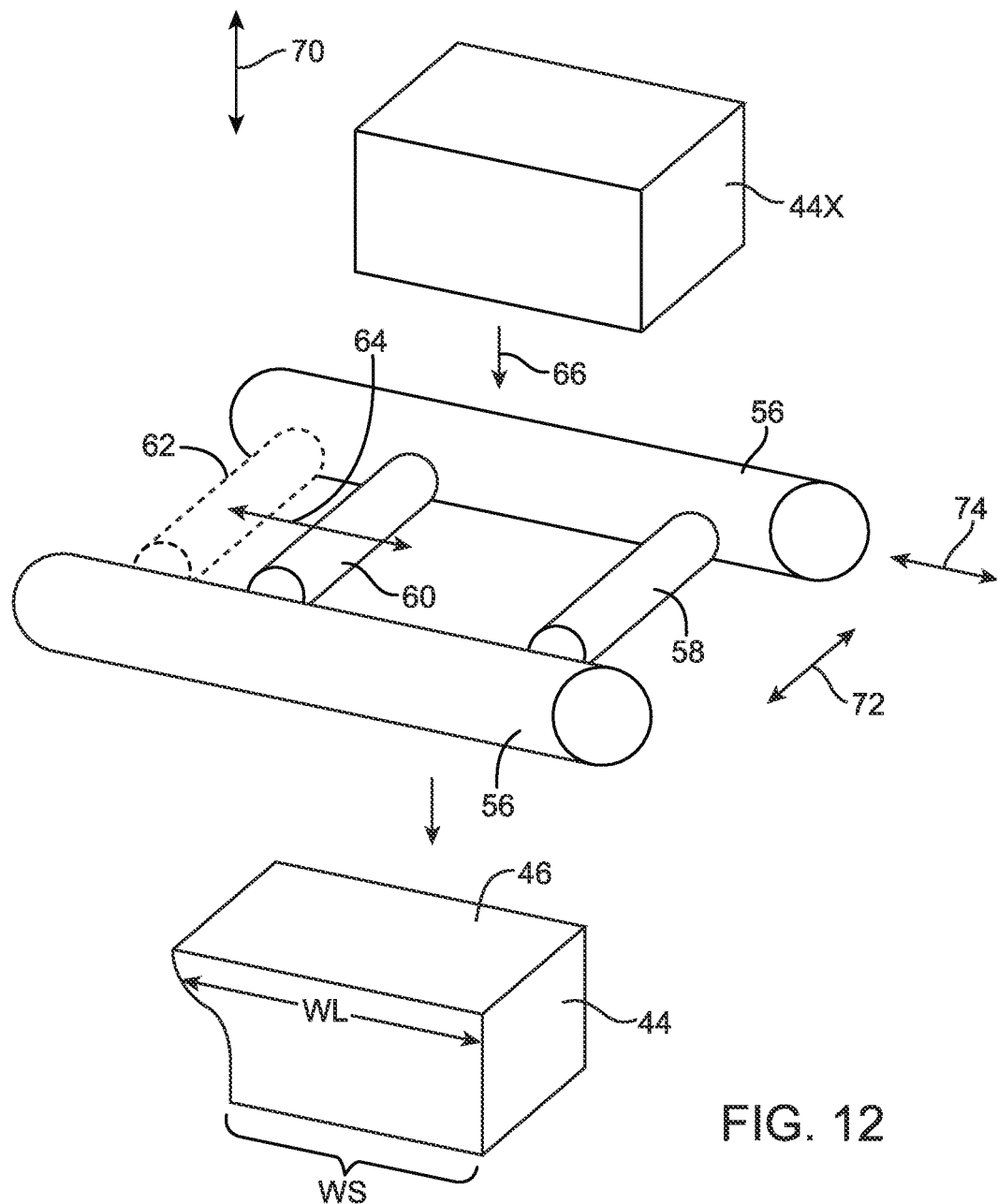
FIG. 12 is a diagram of illustrative equipment that may be used in forming a coherent fiber bundle having fibers with cross-sectional areas of varying aspect ratios in accordance with an embodiment of the present invention.

A system for forming a coherent fiber bundle of the type shown in FIG. 4 is shown in FIG. 12. Initially, fiber bundle 44X may have fibers 44F that are aligned along dimension 70. Heated rollers 56 may be used to constrain fiber bundle 44X with respect to dimension 72. Rollers 58 and 60 may be used to squeeze fiber bundle 44X in dimension 74. For example, roller 60 may be moved along directions 64 between position 62 and the position shown in FIG. 12 in order to apply pressure to fiber bundle 44X as fiber bundle 44X is moved through the roller system in direction 66. Upon exiting the rollers in direction 78, fiber bundle 44 may have the appearance shown in the bottom portion of FIG. 12 in which upper surface 46 has a larger width WL than lower surface width WS (see, e.g., fiber bundle 44 of FIG. 4).

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   an array of pixels configured to emit light; and
   a light guiding structure having first and second surfaces, wherein the light guiding structure is configured to guide light from the array of pixels from the first surface to the second surface, the second surface has a planar central portion and curved edge portions, the light guiding structure comprises a fiber bundle having a plurality of fibers that guide the light to the curved edge portions, and each of the curved edge portions comprises multiple fibers of the plurality of fibers that form a single curved profile.

2. The electronic device defined in claim 1 further comprising:
   display layers in which the array of pixels is formed; and
   a component on the display layers that is overlapped by one of the curved edge portions of the light guiding structure.

3. The electronic device defined in claim 2 wherein the component is a driver integrated circuit.

4. The electronic device defined in claim 2 wherein at least some of the plurality of fibers guide the light from the array of pixels from the first surface to the second surface along curved paths, and wherein at least some of the curved paths overlap the component.

5. The electronic device defined in claim 4 wherein at least some of the plurality of fibers guide the light from the array of pixels from the first surface to the second surface along straight paths.

6. The electronic device defined in claim 1 wherein each fiber of the plurality of fibers comprises a core and a cladding.

7. The electronic device defined in claim 6 wherein the core has a first index of refraction and the cladding has a second index of refraction that is less than the first index of refraction.

8. The electronic device defined in claim 1 wherein a first group of fibers of the plurality of fibers guide the light from the array of pixels from the first surface to the second surface along curved paths.

9. The electronic device defined in claim 8 wherein a second group of fibers of the plurality of fibers guide the light from the array of pixels from the first surface to the second surface along straight paths.

10. The electronic device defined in claim 1 further comprising:
    a display cover layer formed over the array of pixels and the light guiding structure, wherein the display cover layer comprises a layer selected from the group consisting of: a transparent glass layer and a transparent plastic layer.

11. A cellular telephone having a front and a rear, comprising:

a housing;

a speaker in the housing, wherein the speaker emits sound through the front;

a touch-screen display comprising an array of pixels that displays an image at the front of the cellular telephone; and a light guiding structure having first and second surfaces, wherein the light guiding structure is configured to guide light from the array of pixels from the first surface to the second surface to display the image on the second surface, the light guiding structure comprises a fiber bundle having a plurality of fibers that guide the light to the second surface, at least one of the fibers of the plurality of fibers has a first portion that bends in a first direction and a second portion that bends in a second direction that is different from the first direction, and the light guiding structure has curved edge portions that each includes a plurality of multiple fibers of the plurality of fibers that form a single curved profile.

12. The cellular telephone defined in claim 11 further comprising:

display layers in which the array of pixels is formed; and a component on the display layers that is overlapped by one of the curved edge portions of the light guiding structure.

13. The cellular telephone defined in claim 12 wherein the component is selected from the group of components consisting of: a driver integrated circuit, a flexible printed circuit cable attachment pattern, and a trace for distributing display control signals to transistors in the display layers.

14. The cellular telephone defined in claim 11 wherein the array of pixels comprises organic light-emitting diode pixels.

15. The cellular telephone defined in claim 14 wherein the housing comprises a sidewall, wherein a portion of the second surface of the light guiding structure overlaps the sidewall.

16. An electronic device, comprising:

a housing; and a display in the housing that comprises:

an array of pixels that displays an image; and a light guiding structure having first and second surfaces, wherein the light guiding structure guides light from the array of pixels from the first surface to the second surface to display the image on the second surface, wherein the light guiding structure has a planar portion and a curved portion formed from a plurality of fibers, and wherein the curved portion has a single curved profile.

17. The electronic device defined in claim 16 wherein the planar portion comprises an additional plurality of fibers.

18. The electronic device defined in claim 17 wherein the display further comprises:

display layers in which the array of pixels is formed; and a component on the display layers that is overlapped by the curved portion.

19. The electronic device defined in claim 18 wherein at least one of the fibers of the plurality of fibers has a first portion that bends in a first direction and a second portion that bends in a second direction that is different from the first direction.

* * * * *